United States Patent [19]

Hydén et al.

[11] Patent Number: 5,078,548
[45] Date of Patent: Jan. 7, 1992

[54] METHOD OF AND AN INSTALLATION FOR REMOVING AND TRANSFERRING REFUSE

[75] Inventors: Hans Hydén, Vällingby; Yngve Forsberg, Farsta, both of Sweden

[73] Assignee: AB Centralsug, Stockholm, Sweden

[21] Appl. No.: 424,250

[22] PCT Filed: Apr. 20, 1988

[86] PCT No.: PCT/SE88/00201
§ 371 Date: Oct. 23, 1989
§ 102(e) Date: Oct. 23, 1989

[87] PCT Pub. No.: WO88/08402
PCT Pub. Date: Nov. 3, 1988

[30] Foreign Application Priority Data

Apr. 24, 1987 [SE] Sweden ................. 8701698

[51] Int. Cl.⁵ .................................... B65G 53/24
[52] U.S. Cl. ........................... 406/151; 15/345; 15/306.1
[58] Field of Search ......... 406/151, 152, 79, 85, 406/109, 181, 93, 141, 53, 173, 168, 154; 15/306 B, 345

[56] References Cited

U.S. PATENT DOCUMENTS

| | | | |
|---|---|---|---|
| 1,199,201 | 9/1916 | Mote et al. | 406/151 |
| 1,926,306 | 9/1933 | Pettersen | 15/15 |
| 2,255,615 | 9/1941 | Frankel | 15/306 B |
| 2,827,334 | 3/1958 | Sanborn | 406/173 |
| 3,045,273 | 7/1962 | Bruno | 15/306 |
| 3,236,565 | 2/1966 | Kester et al. | 406/173 |
| 3,514,803 | 6/1970 | Turney, Jr. | 15/306 B |
| 3,909,873 | 10/1975 | Minasov et al. | 15/306 B |
| 3,938,533 | 2/1976 | Richard | 134/63 |
| 4,014,356 | 3/1977 | Carieri | 134/63 |
| 4,144,615 | 3/1979 | Hanson | 15/345 |
| 4,420,854 | 12/1983 | Newton | 15/306 B |
| 4,473,922 | 10/1984 | Weihe | 15/306 B |
| 4,670,936 | 6/1987 | Hanson | 15/306 B |
| 4,727,615 | 3/1988 | Swistun | 15/345 |
| 4,881,855 | 11/1989 | Rempel et al. | 406/53 |

FOREIGN PATENT DOCUMENTS

| | | |
|---|---|---|
| 0075725 | 8/1982 | European Pat. Off. . |
| 3642094 | 12/1987 | Fed. Rep. of Germany ........ 406/79 |
| 7804380 | 7/1982 | Sweden . |

Primary Examiner—Joseph F. Peters, Jr.
Assistant Examiner—Christopher P. Ellis
Attorney, Agent, or Firm—Witherspoon & Hargest

[57] ABSTRACT

The invention relates to a method for removing and transferring refuse from serving trays which on conveyor belts are carried past different stations for removing dirty dishes, removing refuse and washing the trays. According to the invention a vacuum is produced in a suction nozzle provided immediately adjacent the path along which the trays are conveyed, and the refuse is transferred through a transfer duct which is connected to the nozzle and through which the vacuum is produced at the nozzle. The invention also relates to an installation for performing the method.

4 Claims, 4 Drawing Sheets

METHOD OF AND AN INSTALLATION FOR REMOVING AND TRANSFERRING REFUSE

BACKGROUND OF THE INVENTION

1. Field of the Invention

The present invention generally relates to a system for handling garbage or waste and more specifically relates to a method and an installation for removing and transferring waste or garbage from serving trays which on conveyor belts are carried past different stations for removing dirty dishes, knives, forks and spoons, removing waste or garbage and washing the trays themselves.

2. Description of the Prior Art

Serving trays or trays on which complete meals are served are presently used to an increasing extent either for serving a complete meal, such as on aeroplanes and in hospitals, or at cafeteria-type restaurants, such as canteens for personnel, lunch rooms, dining-halls etc. In smaller restaurants the trays are usually collected and cleared altogether manually, which brings about relatively high labour costs. Moreover this work is dirty and unhygienic. In order to overcome these problems in larger restaurants and the like systems have been developed for automatizing this handling of the trays, and such systems have for instance been used in catering at airports, where the larger air-lines have their own establishments with kitchens for preparing trays with complete meals and for taking care of the trays after the flights. Thus, the finished trays are transported in special carts or carriages from the aeroplanes and into the kitchen establishment where the trays are placed on conveyor belts on which they are brought past different stations for removing knives, forks and spoons, removing china and for cleaning the trays. In these known establishments so called "flume systems" are used for removing garbage or waste from the trays and for washing the same after they have been cleared from knives, spoons, forks and china. These "flume systems" essentially comprise a water bath into which the trays are introduced by means of the conveyor belt, whereby the garbage or waste is suspended in the water and subsequently is removed from the water bath by means of a separate transport device carrying the waste or garbage to separate containers. The most essential disadvantages of such "flume systems" is on one hand the large volume of water required for operating the system and, on the other hand the fact that the waste or garbage tends to stop up or clog pumps, conveyors and other parts of the system, which in turn means that substantial work has to be put into cleaning the parts of the system when the operation of the system is disturbed. Further disadvantages are that the waste or garbage becomes mixed with water which makes the further transport of the waste more difficult and also more expensive, and that the system is unhygienic due to the unpleasant smell arising in connection with the dewatering of the waste and which may be very annoying to the operators.

SUMMARY OF THE INVENTION

Accordingly, the object of the present invention is to achieve a method and an installation of the kind indicated in the introduction, by means of which the above-mentioned disadvantages of the presently used systems may be eliminated for obtaining a relatively unexpensive and efficient handling of waste or garbage.

In accordance with the invention this object is achieved by means of a method and an installation of the kind indicated in the enclosed, independent claims, whereby the dependent subclaims are directed to preferred embodiments of the method and the installation respectively.

BRIEF DESCRIPTION OF THE DRAWINGS

The invention is more closely described below with reference to an exemplary embodiment thereof illustrated in the enclosed drawings, on which.

DESCRIPTION OF THE PREFERRED EMBODIMENTS

Figure 1:
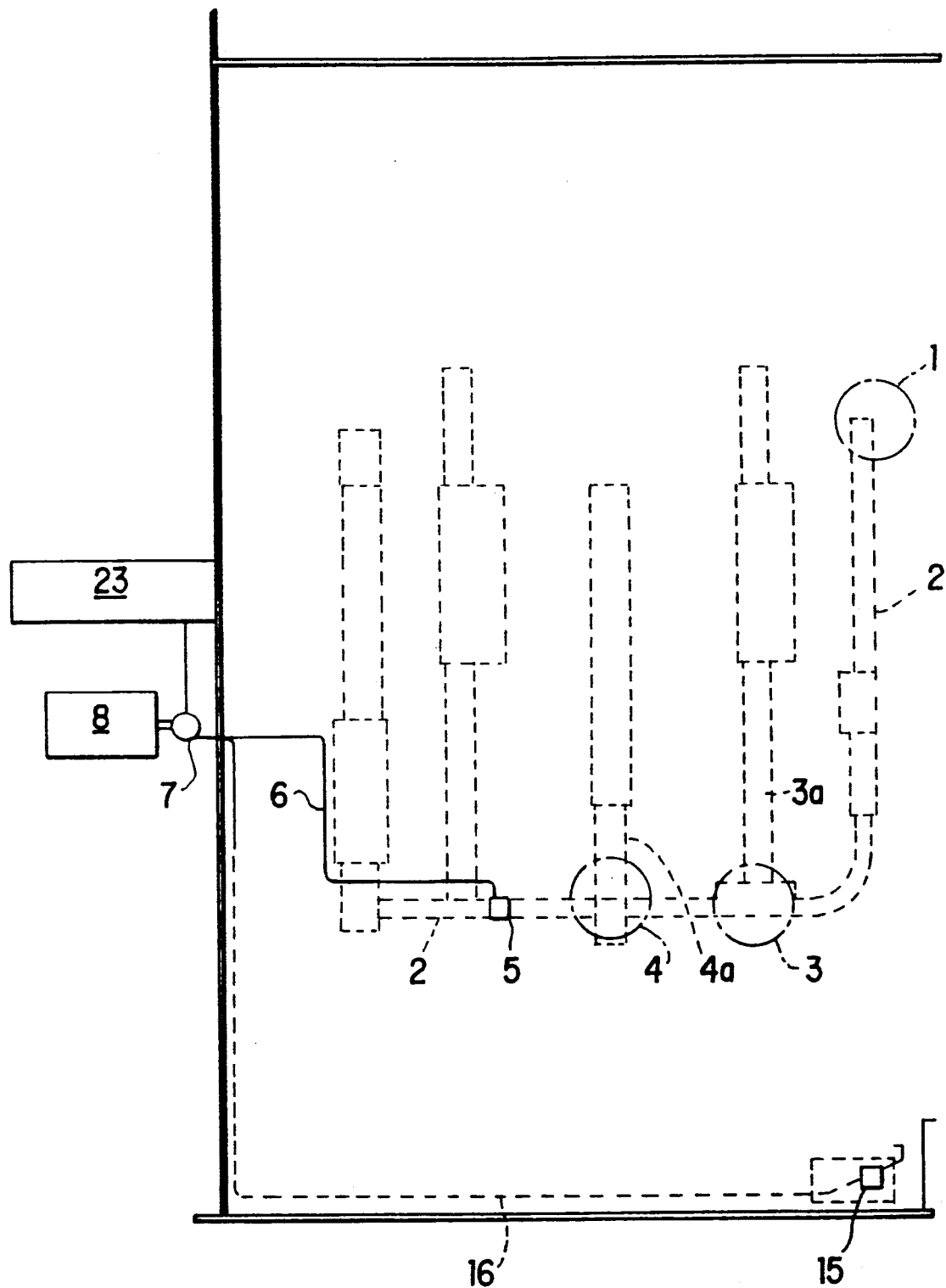
FIG. 1 is a schematic illustration of a system for conveying trays and having a suction installation in accordance with the invention installed.

FIG. 1 schematically illustrates the refuse handling installation according to the invention installed by a tray conveying system of a kind used for instance for the air-lines' flight catering facilities at airports. It should be emphasized that this tray handling system is only illustrated by way of example and that the installation according to the invention naturally may be installed in connected with other kinds of systems for handling the trays.

Briefly the used trays are brought, for instance in special carts or carriages, to a station 1 at the beginning of a conveyor belt 2, and at this station the trays are manually placed on the conveyor belt. Through the conveyor belt the trays are transferred to the next station 3 where china is manually removed from the trays and is placed on a further conveyor belt 3a for further transferring to a dish-washing installation. From this station the trays are conveyed to a further station 4 for manual removing of knives, forks and spoons which by means of a further conveyor belt 4a are likewise transferred to a dish-washing installation. When china and knives, forks and spoons have been removed from the trays so that only refuse constituted of bottles, wrappings, napkins and so forth remain thereon, the trays are transferred, still on the conveyor belt 2, to the suction station or vacuum stripper 5 of the installation according to the invention. At the suction station 5 the refuse is sucked into a transfer duct 6 and through this to a refuse cyclone 7 from which the separated refuse is transferred to a container 8 or the like.

From the suction station 5 the trays, which are now empty, are transferred for washing and drying the same.

Figure 2:
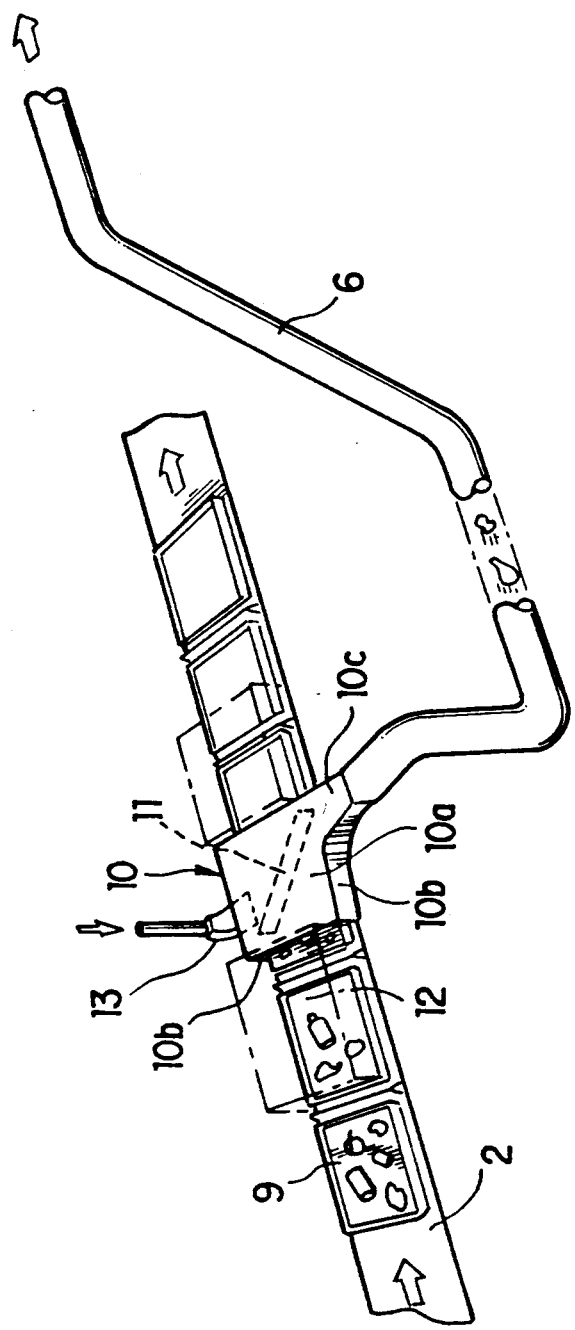
FIG. 2 is a detailed view of the portion of the tray conveyor belt where the suction installation according to the invention is provided.

FIG. 2 gives a more detailed picture of the suction station or vacuum stripping station 5 of the refuse handling system according to the invention, and FIG. 2 illustrates how the trays 9 are transferred on the conveyor belt 2 to a suction nozzle 10 provided directly in connection with the conveyor belt 2. In the illustrated embodiment the nozzle 10 is positioned immediately above the conveyor belt 2 and has a downwardly open U-shape in cross-section so that the nozzle forms a channel through which the trays are conveyed. The nozzle is defined by an upper wall 10a and side walls 10b of which one is discontinuous and provided with a suction opening or orifice 10c.

The nozzle 10 should have a width, i.e. the distance between the side walls 10b, substantially corresponding to the width of the trays 9, but on the other hand the nozzle may be dimensioned shorter than the length of the trays. However, in the illustrated embodiment the nozzle has a length essentially corresponding to that of the trays.

In order to prevent that the trays are sucked away from the conveyor belt by the vacuum a suitable guide (not illustrated) is provided by the conveyor belt. This guide may preferably consist of L-shaped iron beams provided at each side of the conveyor belt, in the area of the nozzle, whereby one leg of the L-beam is extended parallel to the upper surface of the conveyor belt, at a distance above this upper surface, so that the edges of the trays pass between the upper surface of the belt and the leg of the beam and is thereby securely retained on the belt.

Naturally it is also possible to use alternative designs for the nozzle 10. This could for instance also be provided at one side of the conveyor belt 2, directly in connection with the belt, whereby the installation may possibly be supplemented with a device for tilting the trays when they pass the nozzle, so that the refuse through this tilting is brought to slide down towards the nozzle.

In the illustrated embodiment the suction nozzle 10 is provided with a guide means consisting of a plate 11 provided in connection with the upper wall 10a and the surface of which substantially coincides with the surface of the trays. On the one hand the guide plate 11 serves to guide the refuse towards the suction opening 10c and on the other hand it serves to tip or overturn bottles and the like standing upright on the trays. The guide plate may also be replaced by a brush, a rubber strip or the like serving to brush or scrape the refuse even more efficiently from the tray. In order to reduce the sound level by the installation it is also preferable to provide silencers 12 directly in connection with the nozzle 10, possibly both before and after the nozzle, seen in the conveying direction.

In many connections paper covers, like table mats, are used on the trays, partly for protecting the trays and for absorbing possible spillage and partly for aesthetic reasons, and these covers may cause problems in connection with clearing or stripping the trays since they tend to stick to the surface of the trays. In order to solve this problem a blow-off nozzle 13 is provided adjacent one side of the suction nozzle 10, with the opening or orifice of the blow-off nozzle 13 being positioned on a level with the edges of the trays. Due to the fact that high pressure air is continuously or intermittently as the trays pass the blow-off nozzle, blown through the blow-off nozzle 13 air is introduced between the covers and the trays in such a way that the covers may be sucked away with the rest of the refuse. In the case where a brush is used as a guide means this brush may also contribute in removing the covers from the trays and bringing them towards the suction opening.

Figure 3:
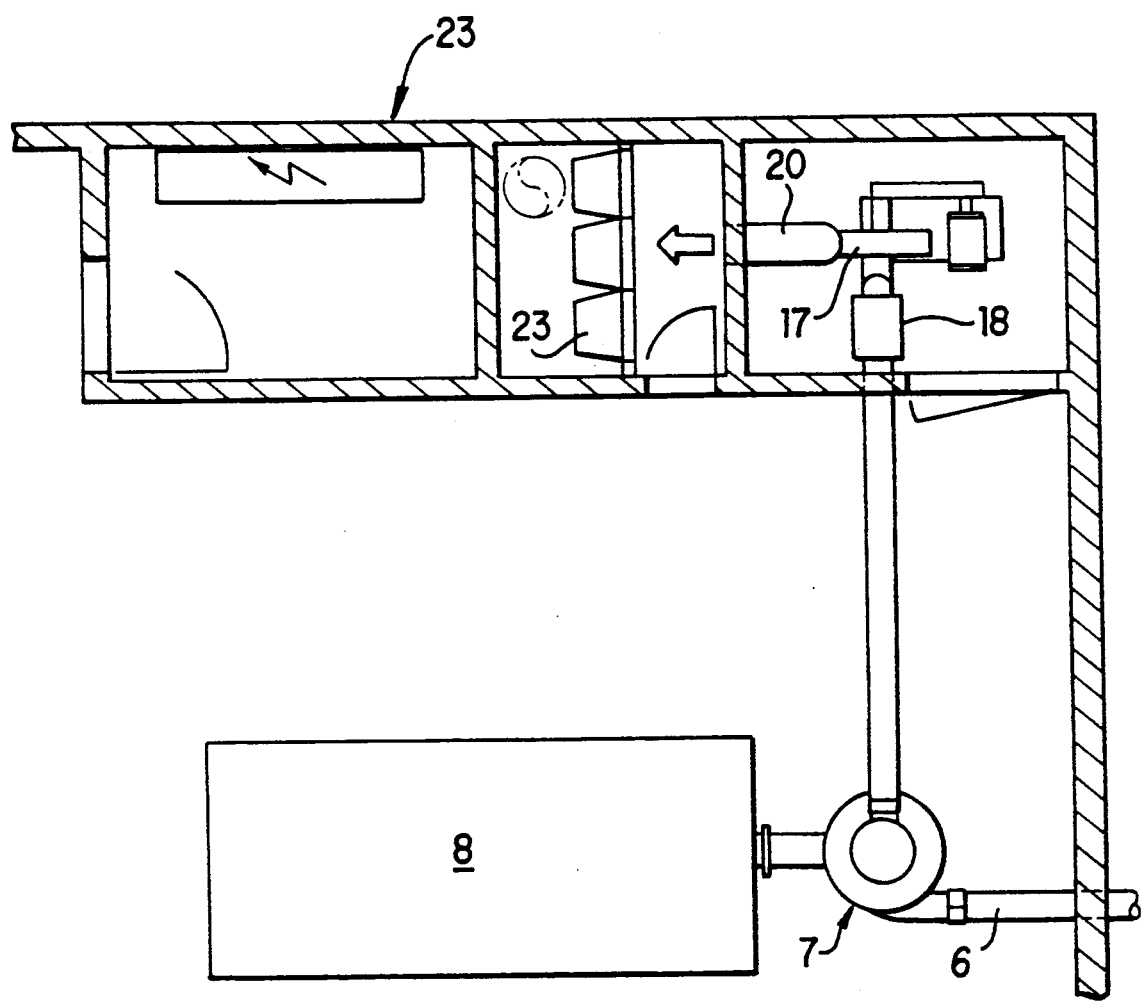
FIG. 3 is a schematic illustration of other parts of the system showing the connection of the transport duct to a refuse cyclone and to a blower unit.
Figure 4:
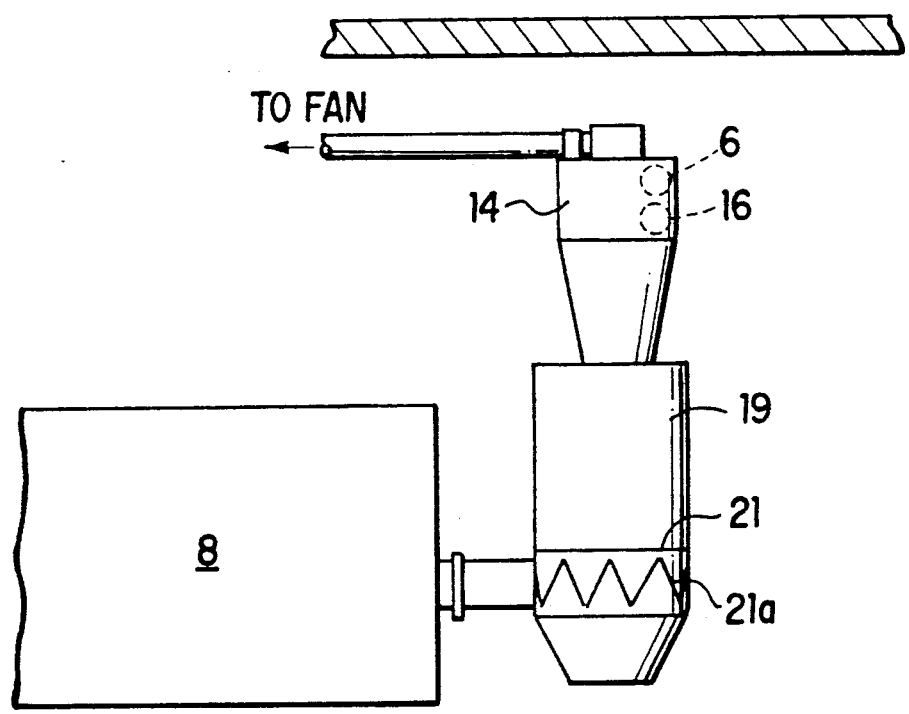
FIG. 4 illustrates, likewise schematically, the closed transport path for the refuse from the transport duct to a container.

The suction opening 10c of the suction nozzle 10 is connected to the transfer duct 6 through which the refuse is transferred to a refuse cyclone 7 provided in a collection terminal (FIGS. 3 and 4).

As is illustrated in FIG. 1 the installation may easily be supplemented with a supplementary feeding chute 15, for instance for bulkier garbage and food waste, which may be combined with a shredder (not shown) and which through a supplementary transfer duct 16 may be connected to the cyclone (FIG. 4).

The vacuum in the transfer duct 6 and possibly in the transfer duct 16 is produced in a conventional manner by means of a suction fan 17 ahead of which an air filtration unit 18 is connected by means of which dust and remaining particles may be filtered out from the air stream. When required the system may also be supplemented with for instance a so called deodorizer filter 22 for minimizing the odour of the discharged air. Finally a silencer unit 20 is connected after the fan 17 for lowering the noise before the discharge of air into the atmosphere. The fan, the filters and the silencer unit are provided in a machinery central unit 23 (FIGS. 1 and 3).

Refuse having been transported through the transfer duct 6 by the air stream enters the top of the cyclone 7 and is separated from the air stream in a manner known per se and is collected in a container 19 below the outlet of the cyclone unit where it enters a compactor unit 21 (FIG. 4) in which all refuse such as food waste, cans, glass, plastic, paper etc. is compacted to minimize the total volume of refuse by removing most of the air trapped in it. The screw 21a of the compactor unit 21 forces the refuse into the closed container 8, whereby spills and unpleasant smells are eliminated since the whole system as described is closed.

Although the invention has been described above with specific reference to an embodiment thereof it should be obvious that the invention may be modified by men skilled in the art without departing from the scope of the invention. As an example the installation may be adapted to different existing systems by providing several suction stations and possibly refuse chutes at different places within a tray handling system. The scope of the invention should therefore only be restricted by the enclosed patent claims.

We claim:

1. Installation for removing and transferring refuse from serving trays (9) which on conveyor belts (2) are carried past different stations (3, 4, 5) for removing dirty dishes, removing refuse and washing said serving trays, comprising a station (5) for removing refuse from said serving trays, said station (5) including refuse removal means positioned immediately adjacent said conveyor belt (2) for removing any bottles, wrappings, napkins and any other refuse from said serving trays (6), and including a suction nozzle (10) positioned immediately adjacent said conveyor belt (2), said suction nozzle being connected to a transfer duct (6) for transferring any of said bottles, wrappings, napkins and any other refuse from said suction nozzle, said transfer duct being connected through a separator (7) to a suction fan (17) for producing vacuum at said vacuum nozzle (10), said separator unit (7) being a cyclone from which the refuse separated from the air is transferred to a compactor unit (21) having a screw (21a) for forcing the compacted refuse to a container (8), said container (8) being a completely closed container tightly connected to the compactor unit, whereby the complete installation is closed from the suction nozzle 10 to the container (8), said suction nozzle (10) being provided immediately above the conveyor belt (2) and having a U-shaped cross-section defined by upper wall (10a) and sidewalls (10b) with an open portion of said U-shape extending downwardly towards the conveyor belt (2) whereby the upper wall is dimensioned such that at least its width, i.e., the distance between the side walls, substantially corresponds to the width of the trays (9) and that the nozzle forms a channel through which the trays are conveyed.

2. Installation according to claim 1, characterized in that a guide means (11) is provided adjacent the upper wall (10a) of the nozzle (10) for guiding the refuse towards a suction opening (10c) in one of the side walls (10b) of the nozzle (10).

3. Installation according to claim 1, characterized in that a blow-off nozzle (13) is provided at one side of the suction nozzle (10), on a level with the side edges of the trays (9), for directing a continuous or intermittent stream of high-pressure air towards the area of the side edges of the trays (9).

4. Installation according to claim 2, characterized in that a blow-off nozzle (13) is provided at one side of the suction nozzle (10), on a level with the side edges of the trays (9), for directing a continuous or intermittent stream of high-pressure air towards the area of the side edges of the trays (9).

* * * * *